(12) United States Patent
Nishimura et al.

(10) Patent No.: US 7,457,988 B2
(45) Date of Patent: Nov. 25, 2008

(54) ELECTRONIC CONTROL SYSTEM AND METHOD HAVING MICROCOMPUTER MONITORING PROHIBITING FUNCTION

(75) Inventors: Toshiro Nishimura, Kariya (JP); Toshihisa Yamamoto, Anjo (JP); Masashi Yamasaki, Nagoya (JP)

(73) Assignee: Denso Corporation, Kariya (JP)

( * ) Notice: Subject to any disclaimer, the term of this patent is extended or adjusted under 35 U.S.C. 154(b) by 598 days.

(21) Appl. No.: 11/071,047

(22) Filed: Mar. 2, 2005

(65) Prior Publication Data

US 2005/0210326 A1 Sep. 22, 2005

(30) Foreign Application Priority Data

Mar. 4, 2004 (JP) ............................. 2004-060410

(51) Int. Cl.
*G06F 11/00* (2006.01)
(52) U.S. Cl. ...................................................... 714/34
(58) Field of Classification Search ................. 714/34; 700/81, 79, 80, 89; 701/29, 33
See application file for complete search history.

(56) References Cited

U.S. PATENT DOCUMENTS

| | | | | | |
|---|---|---|---|---|---|
| 4,709,341 | A | * | 11/1987 | Matsuda | ...................... 714/815 |
| 5,142,474 | A | * | 8/1992 | Miyata et al. | .................. 701/33 |
| 5,367,665 | A | | 11/1994 | Koch et al. | |
| 5,677,838 | A | * | 10/1997 | Itou et al. | ...................... 701/29 |
| 5,850,514 | A | * | 12/1998 | Gonda et al. | .................. 714/55 |
| 5,897,596 | A | * | 4/1999 | Kabune et al. | ................. 701/29 |
| 5,980,081 | A | * | 11/1999 | Watari et al. | ................... 700/79 |
| 6,144,887 | A | * | 11/2000 | Kamiya et al. | ................. 700/79 |
| 6,493,593 | B1 | * | 12/2002 | Kamiya et al. | ................. 700/2 |
| 7,236,921 | B1 | * | 6/2007 | Nemecek et al. | .............. 703/28 |
| 2007/0083305 | A1 | * | 4/2007 | Okada et al. | .................. 701/29 |
| 2008/0114501 | A1 | * | 5/2008 | Wu | ............................... 701/2 |

FOREIGN PATENT DOCUMENTS

| | | |
|---|---|---|
| JP | 04-160539 | 6/1992 |
| JP | 10-63542 | 3/1998 |
| JP | 11/336604 | 12/1999 |

(Continued)

OTHER PUBLICATIONS

Office Action for corresponding Korean Application No. 10-2005-0017661 dated Aug. 14, 2006 and English translation thereof.

(Continued)

*Primary Examiner*—Robert Beausoliel
*Assistant Examiner*—Amine Riad
(74) *Attorney, Agent, or Firm*—Harness, Dickey & Pierce, PLC

(57) ABSTRACT

An electronic control system has a microcomputer monitoring section and an output controlling section. A microcomputer is prohibited from controlling control objects of a vehicle by a control prohibition section in the output controlling section and monitoring halting section halts the abnormality monitoring program executed by a monitoring section, when there is a heavy-load program processing request. Thus, the microcomputer executes the heavy-load program processing with reduced processing load. The abnormality monitoring is started by the monitoring section, when the processing of the heavy-load program is terminated. Further, after normal operation of the microcomputer is checked, the control system allows the microcomputer to start controlling the control objects.

11 Claims, 4 Drawing Sheets

FOREIGN PATENT DOCUMENTS

| | | |
|---|---|---|
| JP | 2002-41493 | 2/2002 |
| JP | 2002-009321 | 4/2002 |
| JP | 07-291091 | 11/2005 |

OTHER PUBLICATIONS

Office Action dated Dec. 1, 2006 for corresponding Chinese Application No. 2005100529942 and English translation thereof.

Office Action dated May 25, 2007 for corresponding Chinese Application No. 2005100529942 and English translation thereof.

Office Action dated Oct. 23, 2007 for corresponding Japanese Application No. 2004-060410 and English translation thereof.

Office Action dated Jun. 25, 2008 for corresponding Japanese Application No. 2004-060410 and English translation thereof.

\* cited by examiner

ELECTRONIC CONTROL SYSTEM AND METHOD HAVING MICROCOMPUTER MONITORING PROHIBITING FUNCTION

CROSS REFERENCE TO RELATED APPLICATION

This application is based on and incorporates herein by reference Japanese Patent Application No. 2004-60410 filed on Mar. 4, 2004.

FIELD OF THE INVENTION

This invention relates to an electronic control system and method which has a microcomputer abnormality monitoring prohibiting function.

BACKGROUND OF THE INVENTION

An electronic control system for vehicles has a function of monitoring its microcomputer forming a control system to check whether it is operating normally in order to prevent erroneous operations of the control system. This monitoring ensures safety of a vehicle. For monitoring microcomputers, for example, a watch-dog timer system, an assignment and answer system, etc. are known.

In the watch-dog timer system, elapse of time is measured by counting an input clock from the microcomputer, and a reset signal is generated when the measured time reaches an abnormality monitoring time. This reset signal resets and restarts the microcomputer. In the assignment and answer system, a predetermined monitoring signal (assignment) is applied to a microcomputer for operation calculation by the microcomputer. After that, it is determined whether its operation result (answer) is the same as an operation result that should be obtained when the microcomputer is normally operating. When the two results are different from each other, the microcomputer is determined to be in an abnormal state, and a reset signal is generated to restart the microcomputer.

In particular, the monitoring system based on the assignment and answer system has both an assignment sending unit for sending data for monitoring (assignment data) that is outputted to a microcomputer and an answer determination unit that receives operation result data (answer data) that the microcomputer performed arithmetic processing on the signal and determines whether the operation result is correct.

In this case, the assignment sending unit sends out the assignment data that is stored in a storage unit, such as RAM and ROM, provided in the monitoring system. The microcomputer that received the input of the assignment data performs the arithmetic processing on the assignment data using an arithmetic circuit of its own. The operation result is inputted into the answer determination unit provided in the monitoring system, and the answer data is compared with correct answer data.

When the two data coincide with each other, the microcomputer is determined normal. When the data do not coincide, the microcomputer is determined abnormal. At the same time, time elapsed before reception of the answer data from sending of the assignment data is counted. In the case where the answer data is not received even after a predetermined time elapse, the microcomputer is determined abnormal.

When monitoring processing for monitoring normality/abnormality of a microcomputer like this is monitoring processing of a microcomputer provided in, for example, an electronic control system for vehicles, the assignment data starts to be transmitted immediately after an ignition is turned on, thereby starting the normality/abnormality determination processing of the microcomputer.

In recent electronic control systems for vehicles, it became more and more likely that immediately after ignition (IG switch) is turned on, the monitoring system erroneously determines that a microcomputer is abnormal although it is normal in reality. This erroneous determination occurs from microcomputer's incapability of outputting an answer signal within a predetermined time when an assignment signal is inputted into the microcomputer from the monitoring system. This is because, when the electronic control system for vehicles is started just after the ignition is turned on, a program for checking initial conditions of various control objects of a vehicle runs, and at the same time programs of the control objects are read and written. Consequently the microcomputer of the control system is put under an extremely heavy operation load.

In recent years, such control objects of the control system tend to increase in number, and the capacities of these control programs are becoming larger. Consequently it is anticipated that the load imposed on the microcomputer should become heavier, giving high possibility that the above problems are more likely to arise than before.

The above problems resulting from insufficiency of the microcomputer's processing capability can be circumvented by providing the electronic control system with a microcomputer having high processing performance. However, this may lead to enlargement of the control system and lack of arrangement space. Moreover, it also leads to a higher price of a vehicle that carries this system. Further, the microcomputer is required to have high processing performance only in limited states, such as at the time of turning-on of the IG switch, other than normal control. Therefore, it is more preferable to use a microcomputer having processing performance that matches normal control.

SUMMARY OF THE INVENTION

Therefore, it is an object of this invention to provide an electronic control system and method that reduces an erroneous determination that a microcomputer is abnormal when the microcomputer is in a heavy-load state immediately after the control system is activated.

According to this invention, a supervisory signal is inputted into a microcomputer, and based on its operation result and arithmetic processing time, abnormality of the microcomputer is monitored. When a heavy-load program processing request signal is inputted, the control system prohibits the control by the microcomputer and then halts monitoring of it. The heavy-load program may be a program that is requested to be processed when the control system is in a state other than the normal control.

During processing of the heavy-load program, even when the microcomputer is operating correctly, the arithmetic processing takes a time and consequently it may possibly be determined that the microcomputer is abnormal. Usually, when the microcomputer is determined abnormal, the microcomputer will be reset and the arithmetic processing that was performed up to that moment will be initialized. In some cases, the arithmetic processing is restarted depending on the contents of each case. However, since the microcomputer is still in the same heavy-load state as before being reset, it is likely that the microcomputer would be reset again and could not finish the arithmetic processing.

Unlike the conventional case, abnormality monitoring processing is not executed during processing of the heavy-load program. Consequently the microcomputer is not reset due to an erroneous determination. Therefore, even in the heavy-load state, the microcomputer can execute continuously the program processing that is in progress until the program processing is completed. When the control system is not executing the abnormality monitoring processing of the microcomputer, the microcomputer is prohibited from controlling control objects. Therefore, even when the microcomputer becomes abnormal during this halt of the abnormality monitoring, safety of the vehicle is ensured.

Here, the microcomputer state other than the normal control that were determined in advance means a state at the moment when a program in the storage unit of the microcomputer is overwritten, especially, immediately after the microcomputer received a start request, in a development phase of the control system, and the like. For example, when the control system is a control system for vehicles, the state includes a state at the moment when the ignition of a vehicle is turned on, the moment when a program stored in a storage unit of an in-vehicle microcomputer is overwritten by a vehicle manufacturer, etc.

Immediately after the ignition of a vehicle is turned on, following processes are executed in parallel: reading of a control program for controlling the control objects, system check to check initial settings of the control objects, initial settings of the control objects, etc. In addition, when a program for controlling a vehicle stored in the storage unit of the microcomputer is overwritten, a large amount of program data is inputted by communication from the outside and is written in the storage unit. Under such situations, the load imposed on the microcomputer is extremely heavy, and consequently its processing speed becomes slow, which may result in an erroneous determination.

According to this invention, a program that should be processed under these situations is specified in advance. When there arises a request for requesting the processing of that program, the abnormality monitoring processing can be halted, whereby an erroneous determination can be prevented. The heavy-load programs include any program that must be processed in the heavy-load state of the microcomputer predictable in advance, such as immediately after activation of the microcomputer and at a time of overwriting the programs.

Therefore, the electronic control system may be a control system whose state other than the normal control is an initial control state in which the microcomputer executes the control immediately after ignition start of the vehicle. Moreover, the control system may be a control system characterized in that the heavy-load program is in a control state in which a program stored in the storage unit of the microcomputer is overwritten at the time of vehicle stop.

Furthermore, a signal for monitoring (supervisory signal) is inputted into the microcomputer, and the control system executes abnormality monitoring of the microcomputer based on its operation result and arithmetic processing time. Here, the operation result of the microcomputer is operation result data that is obtained by the microcomputer performing the arithmetic processing on the supervisory signal. The arithmetic processing time is a time that reflects a time elapsed from the moment when monitoring means inputs the supervisory signal into the microcomputer until the monitoring means obtains operation result data of it.

At this time, it is possible to prevent the erroneous determination by lengthening this monitoring processing time. However, in consideration of safety control of the vehicle, it is preferable that the arithmetic processing time is set on the basis of arithmetic processing time in the normal control state. An abnormality monitoring halt state is defined as an exceptional state separately from the normal control state, the abnormality monitoring halt state can be set without relaxing the abnormality monitoring conditions under the normal control state.

When the microcomputer is in a state other than the normal control, and there is a heavy-load program processing request, the control system halts the abnormality monitoring of the microcomputer and prohibits the microcomputer from controlling the control objects. When the microcomputer is in a state of processing the heavy-load program as described above, the control system does not execute the abnormality monitoring.

By this procedure, erroneous determinations resulting from heavy processing load can be prevented. In a state where such abnormality monitoring is not executed, it is impossible to determine whether the microcomputer is operating normally. It cannot be guaranteed that the microcomputer is functioning correctly. Therefore, when the abnormality monitoring is not being executed, it can be made that the erroneous signal is not inputted into the control objects by prohibiting the microcomputer from controlling the various control objects.

The operation result determination processing is halted in response to an input of the heavy-load program processing request signal. Output of the supervisory signal is halted in response to an input of the heavy-load program processing request signal. The both processes may be executed simultaneously. Thus, signal processing when the monitoring is being halted is unnecessary. Therefore halt of output of the supervisory signal and halt of operation result determination processing are effective because they do not impose an extra load on the microcomputer.

The heavy-load program processing request signal is output in response to a processing request signal for requesting the processing of the heavy-load program that is outputted from the outside of the microcomputer. Since it is only required that the heavy-load program processing request signal is output to the microcomputer and a control prohibiting section, the request signal may be output either in the inside or the outside of the microcomputer.

For example, in the case where the monitoring is halted by turning on the IG in the control system for vehicles, the control system may be configured so that the ON signal from the IG switch can be inputted directly into the monitoring section and the control prohibiting section, respectively. At this time, the monitoring section and the control prohibiting section infer that the processing of the predetermined heavy-load program of the microcomputer has been started, and can prohibit the microcomputer from controlling the control objects and halt the abnormality monitoring processing.

The control prohibiting section may be a circuit that is provided in an output control system electrically connected to the microcomputer and the control objects in order to prohibit the microcomputer from controlling the control objects.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
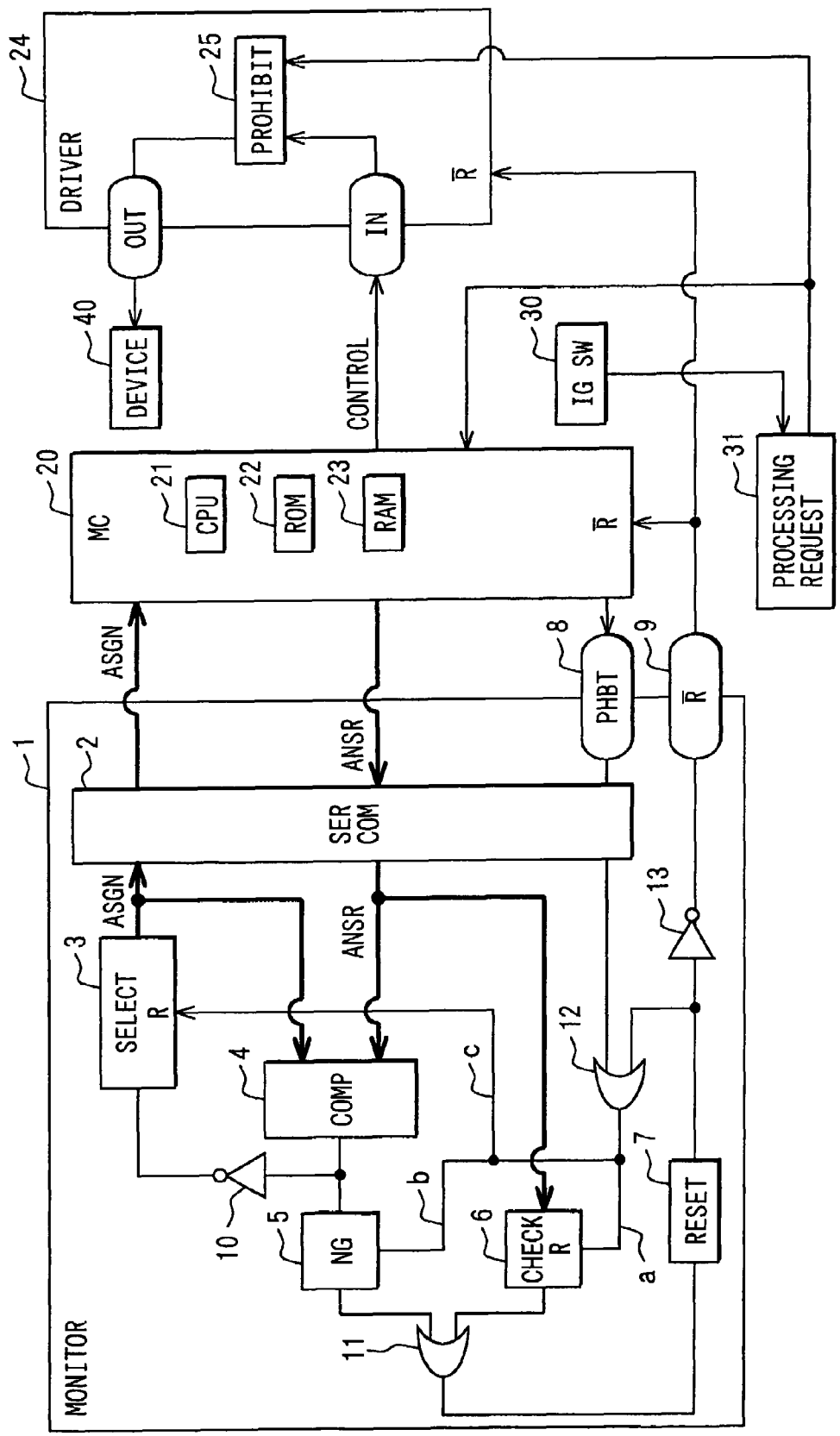
FIG. 1 is a block diagram showing an electronic control system according to an embodiment of this invention.

Referring to FIG. 1, an electronic control system is comprised of a microcomputer 20 for outputting control signals for various in-vehicle devices (control objects) 40, a monitoring block 1 for monitoring operations of the microcomputer 20, and an output control block (output driver) 24 that receives a control signal from the microcomputer 20 and actually controls the various in-vehicle devices 40.

The microcomputer 20 includes a CPU 21, a ROM 22, a RAM 23, IO ports, etc. and outputs control signals for the in-vehicle devices 40 to the output driver 24 based on various programs stored in a storage unit of ROM 22, RAM 23, etc. Control signals that control the in-vehicle devices 40 are generated by the CPU 21 in the microcomputer 20. The CPU 21 is an arithmetic circuit in the microcomputer 20.

The microcomputer 20 is activated or started with turning-on of an ignition switch (IG switch) 30, and a heavy-load program processing request unit 31 that received the ON signal of the IG switch outputs a heavy-load program processing request signal to the microcomputer 20 concurrently with the activation. Consequently the start-up program is read from the storage unit and executed. The microcomputer 20 specifically reads various programs for controlling the in-vehicle devices 40 etc., and starts to control the in-vehicle devices 40. When this start-up program is executed, processing of system check for checking the initial state, initial settings for controlling the various control objects, and the like is executed. Upon completion of these processes, the start-up program is terminated and the control in the normal running state is started.

At the time of the start-up processing of this microcomputer 20, the microcomputer 20 (also performing monitoring halting) outputs to the monitoring block 1 an assignment answer inhibit signal. This inhibit signal is output in response to a signal from the heavy-load program processing request unit 31 for halting the monitoring processing executed by the monitoring block 1.

In this case, the monitoring block 1 is configured to receive an input of the assignment answer inhibit signal from the microcomputer 20. Alternatively, the input of the assignment answer inhibit signal may be directly received from other devices such as the ignition switch 30 etc., bypassing the microcomputer 20.

The monitoring block 1 is connected to the microcomputer 20 through a serial communication unit 2 which is capable of serial communication. The monitoring block 1 sends assignment data (ASGN) of a predetermined number of bits to the microcomputer 20 as a supervisory or monitor signal to make the arithmetic circuit of the microcomputer 20 perform arithmetic processing.

The monitoring block 1 receives the operation result as answer data (ANSR) to determine whether the answer data is correct. The monitoring block 1 thereby monitors the microcomputer 20 to determine whether it is in an abnormal state. It is noted that, in parallel to microcomputer monitoring of this assignment and answer system, microcomputer monitoring of a conventional watchdog timer system may be executed simultaneously.

An assignment data selection unit 3 uses a counter circuit to create assignment data, and transmits this to the microcomputer 20. At this time, the assignment data is read in synchronization with a system clock of the microcomputer 20, and the read assignment data is transmitted to the microcomputer 20 sequentially through the serial communication unit 2 by serial communication.

The microcomputer 20 performs the arithmetic processing on this assignment data, and transmits an operation or calculation result to a comparison determination unit 4 as answer data by serial communication. This arithmetic circuit assumes such complex processing as cannot be processed when the microcomputer 20 is abnormal, so that the assignment data is realized by a simple circuit that uses the counter circuit.

The comparison determination unit 4 executes a comparison operation of the answer data received in synchronization with the predetermined clock period of the microcomputer 20 and model or reference data (correct answer data) for the answer data. It determines the answer data as a correct answer when both data coincide with each other. It also determines the answer as an incorrect answer when not in coincidence.

When the answer data is determined incorrect (NG), the comparison determination unit 4 outputs a logical high-level signal (H signal) to an NG determination unit 5. When the answer data is determined correct (OK), the comparison determination unit 4 outputs a logical low-level signal (L signal) to the NG determination unit 5. Each of the assignment data, the answer data, and the correct answer data is a digital data of a predetermined number of bits.

When the comparison determination unit 4 outputs the H signal to the NG determination unit 5, the assignment data selection unit 3 will receive an input of the L signal through an inverter 10. The assignment data selection unit 3 made up of counter circuits counts the number of H signals (assignment renewal signal) of input signals.

The assignment data selection unit 3 alters the assignment data to be transmitted to the microcomputer 20 according to the increases in the number of counts in the counter, and transmits the assignment data different from hitherto transmitted assignment data (data created by adding 1 to the previous assignment data). It is noted that, the assignment data may not be renewed until the NG determination is made up to a predetermined number (e.g., three times). Alternatively, the assignment data may be renewed each time the NG determination is made.

The NG determination unit 5 receives an input of the H signal when the determination result is NG in the comparison determination unit 4. The comparison determination processing is repeatedly executed. However, in the case where results of the comparison determination processing show a predetermined number of consecutive NGs (for example, a case where three consecutive NGs are produced), the NG determination unit 5 determines that the microcomputer 20 is in an NG state (abnormal state) and keeps outputting the H signal to an OR circuit 11 until the NG determination unit 5 receives an input of a reset signal. When a determination is OK, the NG determination unit 5 outputs the L signal.

An answer renewal check unit 6 is configured to include a counter timer, and measures a time elapsed from a moment when the comparison determination unit 4 receives the answer data to a moment when it receives the next answer data including an arithmetic processing time of the microcomputer 20. When this renewal time exceeds the predetermined time (for example, 30 ms), the answer renewal check unit 6 determines the microcomputer 20 to be in an NG state (abnormal condition), and keeps outputting the H signal until the NG determination unit 5 receives an input of the reset signal. When a determination is OK, the answer renewal check unit 6 outputs the L signal.

The output signals from the NG determination unit 5 and from the answer renewal check unit 6 are inputted into the OR circuit 11. When either unit inputs the NG signal, i.e., the H signal, into the OR circuit 11, the OR circuit 11 outputs the H signal to a rest pulse generation circuit 7. The reset pulse generation circuit 7 converts the inputted H signal into a pulse signal of a predetermined width, and outputs this signal to an OR circuit 12 and an inverter 13. In the case where both of the NG determination unit 5 and the answer renewal check unit 6 output the L signal, that is, the both units make OK determinations, the reset pulse generation circuit 7 does not generate the pulse signal.

When the reset pulse generation circuit 7 generates the resent pulse signal, the pulse signal is inputted into the OR circuit 12. At this time, the OR circuit 12 receives an input of the L signal from the microcomputer 20 when the microcomputer 20 is executing the normal control. Therefore, from the OR circuit 12, the pulse signal is outputted to the assignment data selection unit 3, the NG determination unit 5, and the answer renewal check unit 6, respectively. Thus, each of these three units is reset and initialized in response to an input of the pulse signal of the H level.

Moreover, when the reset pulse generation circuit 7 generates the reset pulse signal, the same pulse signal is inputted into the inverter 13. The inverter 13 reverses this pulse signal and outputs the reversed pulse signal to the microcomputer 20. Thus, the microcomputer 20 is reset and initialized in response to the signal of the L level that is the reversed pulse signal. As a result, the monitoring block 1 and the microcomputer 20 in which abnormality has occurred are reset and initialized.

However, there is no guarantee that the microcomputer 20 necessarily returns to and recovers its normal state from an abnormal state by the reset. Therefore, in this control system, a control prohibition circuit prohibits the microcomputer 20 from controlling the control objects until the abnormality monitoring section can check the normal operation of the microcomputer 20. In the case of the microcomputer 20 in FIG. 1, since the microcomputer 20 controls a vehicle, the control of the in-vehicle devices 40 will be halted.

For example, when the microcomputer 20 in FIG. 1 is controlling a power-assisted motor of an electric power steering device as a control object, the control of the motor will be halted. Therefore, a driver will execute handle operations without power assistance by the motor after this halt. Further, when the microcomputer 20 is controlling a brake hydraulic control of ABS equipment as a control object, the brake hydraulic control will be halted and the user will execute normal brake operations.

Even when these vehicular controls are halted, it causes no problem in running the vehicle. Usually, in the case of any abnormality of the vehicular control system like this, it is configured to work on a safety side. The output driver unit 24 also control in a fail-safe mode.

When the electronic control system for vehicles is in a state other than the normal control, that is, the microcomputer 20 is in a normal state but in a heavy-load state, processing capacity of the microcomputer 20 will be lowered. Further, a time from reception of the assignment data to transmission of the answer data in the monitoring processing will become longer. Consequently the microcomputer 20 will receive an NG determination by the answer renewal check unit 6. In this case, although the microcomputer 20 is operating normally, the microcomputer 20 is rest and the control system will not control the in-vehicle devices 40 after that.

Therefore, in this embodiment, regarding immediately after the IG switch 30 is turned on, the control system is configured so as to halt the abnormality monitoring processing executed by the monitoring block 1 and to allow the control prohibition circuit to block out an output from the microcomputer 20 to the in-vehicle devices 40 in order that the in-vehicle devices 40 would not be controlled in a state where a monitoring function is not working. A control prohibition circuit 25 for prohibiting the microcomputer 20 from controlling the control objects like this may be installed in the output control system, as in FIG. 1. Alternatively the circuit may be configured to be as an independent circuit outside the output control system.

The monitoring block 1 executes the monitoring halt processing as follows for halting monitoring the microcomputer 20. In the electronic control system for vehicles, the heavy-load program processing request unit 31 outputs a signal for requesting the processing of the start-up program to the microcomputer 20 when the IG switch 30 is turned on. Consequently the microcomputer 20 transmits the assignment answer inhibit signal (monitoring inhibit signal) to the monitoring block 1.

The assignment answer inhibit signal is transmitted to the OR circuit 12 through the serial communication unit 2 as a H signal. When this H signal as the assignment answer inhibit signal is inputted into the OR circuit 12, the OR circuit 12 will output the H signal to the assignment data selection unit 3, the NG determination unit 5, and the answer renewal check unit 6, keeping these three units in their reset states all the time. Thus, the monitoring of the microcomputer 20 by the monitoring block 1 is halted.

In this case, it is not necessary to halt all the three units. For example, the circuit may be configured so that the NG determination unit 5 and the answer renewal check unit 6 are always kept in a reset state, and even when the assignment data selection unit 3 sends the assignment data to the microcomputer 20, the NG determination is not executed on answer data of it.

In this case, since the signals outputted from the NG determination unit 5 and from the answer renewal check unit 6 are always the L signal, and therefore the reset pulse generation circuit 7 does not generate a reset pulse signal, and the microcomputer 20 will not be reset. In this case, only circuits a and b are needed and a circuit c is unnecessary.

Figure 2:
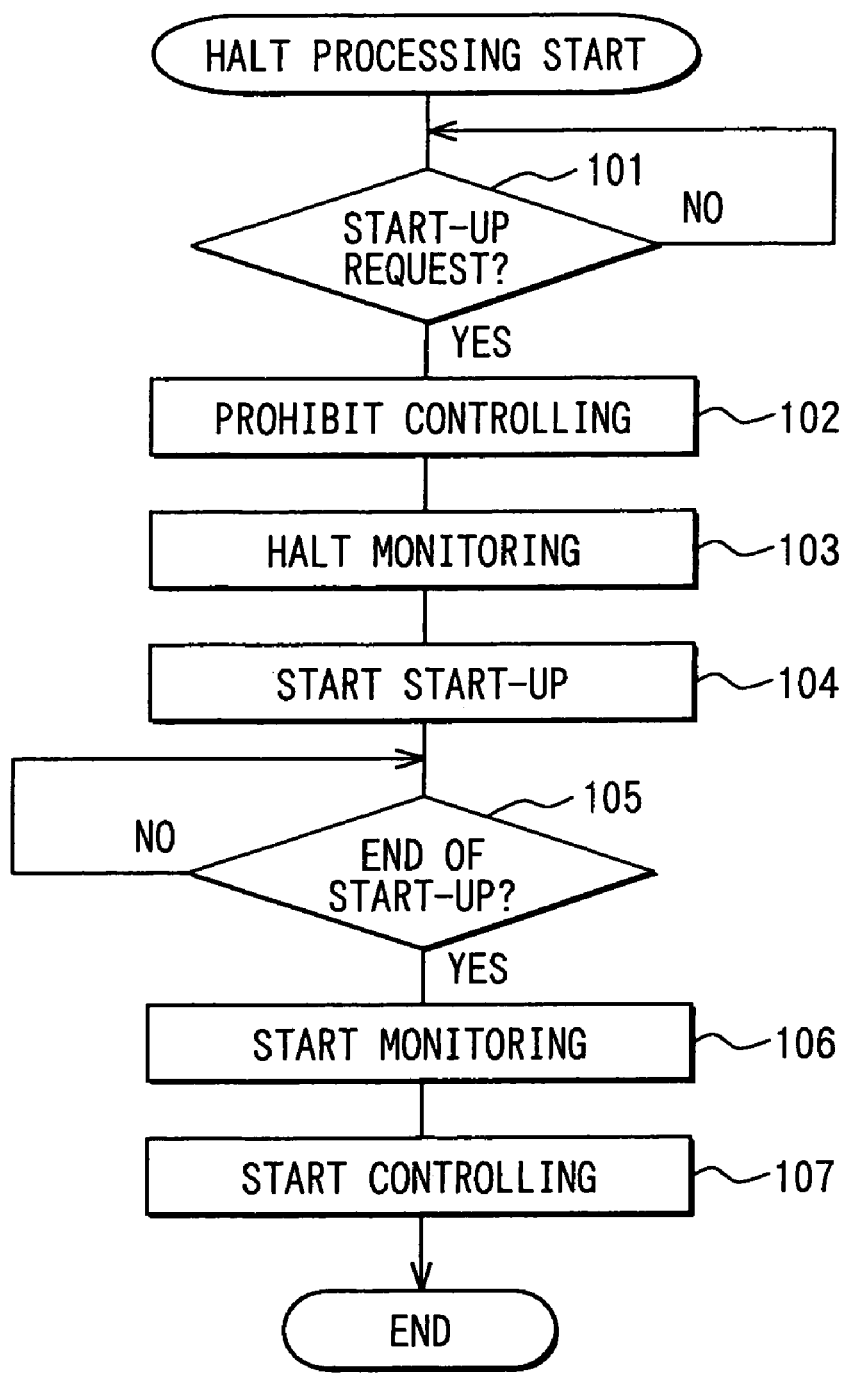
FIG. 2 is a flowchart showing a first example of microcomputer monitoring halt processing executed in the control system shown in FIG. 1.

Hereafter, regarding the abnormality monitoring halt processing of the electronic control system for vehicles, a flow for executing the processing will be described. FIG. 2 is a flowchart of the microcomputer halt processing in response to an event of the turning-on of the IG switch 30.

In step 101, it is determined whether a start-up (activation) request of the microcomputer 20 is issued. When the heavy-load program processing request unit 31 (heavy-load program processing requesting section) detects the ON signal of the IG switch 30, the processing proceeds to step 102 in order to output the start-up request signal to the microcomputer 20. Conversely, when the IG switch continues to be off (no start-up request), the flow returns to step 101 again.

In step 102, a control prohibition circuit 25 prohibits the microcomputer 20 from controlling the various in-vehicle devices 40. Control signals to the in-vehicle devices 40 may be blocked using, for example, a switch circuit. In step 103, the microcomputer abnormality monitoring processing by the monitoring block 1 is halted. Because of this, in the case where the microcomputer 20 is not being monitored for its abnormality by the monitoring halt processing in step 103, the in-vehicle devices 40 is not controlled by the microcomputer 20 at all.

Halt of the microcomputer monitoring processing in step 103 is done by being triggered by an input of the assignment answer inhibit signal that the microcomputer 20 transmitted to the OR circuit 12 of the monitoring block 1. The assignment answer inhibit signal is not necessarily required to be outputted from the microcomputer 20. In this case, the control system may be configured so that the monitoring block 1 receives an input of the H signal directly from the IG switch 30, bypassing the microcomputer 20.

In step 104, the start-up processing is started in response to an event that the microcomputer monitoring is halted in step 103. In step 105, it is determined whether the start-up processing is completed. When it is terminated, the processing proceeds to step 106. By the termination of the start-up processing, the microcomputer 20 is put under a load roughly equal to a load when the vehicle is normally running, not bearing as heavy a load as when being activated.

In step 106, in response to an event that the microcomputer 20 has become in a control state of normal running, the control system starts the monitoring processing. In step 107, in response to an event that the microcomputer 20 has become in a monitoring state by the monitoring block 1, the control system removes the control prohibition state laid on the microcomputer 20 by the control prohibition circuit 25, allows the microcomputer 20 to start to control the various in-vehicle devices 40, and terminates this processing.

It is noted that the microcomputer monitoring halt processing in FIG. 2 is not applied only at a time when the microcomputer 20 is put under a heavy load immediately after the turning-on of the IG switch of the vehicle. For example, when programs stored in ROM 22 and RAM 23 of the microcomputer 20 are being overwritten in a vehicle maker, the microcomputer 20 is put under a heavy load, as at the time of turning-on of the IG switch 30, and its processing speed is lowered.

Figure 3:
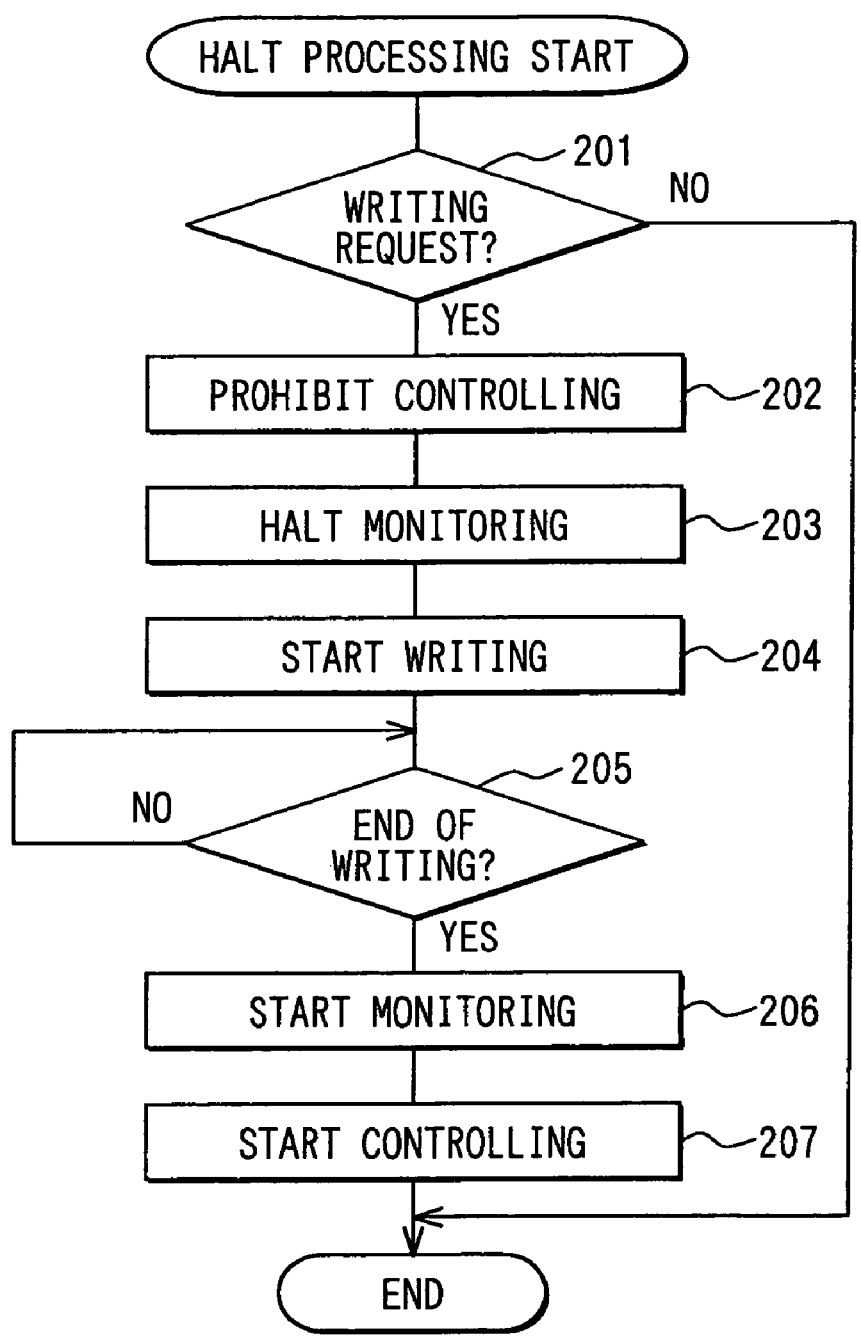
FIG. 3 is a flowchart showing a second example of microcomputer monitoring halt processing executed in the control system shown in FIG. 1.

In this case, microcomputer monitoring halt processing can be executed as shown in a flowchart shown in FIG. 3.

In step 201 in FIG. 3, it is determined whether the microcomputer 20 received a program writing request (a kind of heavy-load program processing requests). The writing request can request processing of a program overwriting program by sending a signal, for example, from the outside that urges the heavy-load program processing request unit 31 to transfer to a program overwriting mode and making the said request unit 31 input a program overwrite processing request signal (a kind of the signal of requesting the heavy-load program processing) into the microcomputer 20.

When there is a writing request in step 201, the processing proceeds from step 202 to step 203. When there is no writing request, the processing ends. In step 202 and step 203, as in step 102 and step 103 in FIG. 2, the microcomputer 20 is prohibited from controlling the various in-vehicle devices 40 and subsequently the microcomputer monitoring is halted. After checking these halts, in step 204, processing of writing the program into the storage unit of the microcomputer 20 is started.

When the write processing is terminated, the processing proceeds from step 205 to steps 206 and 207, where the microcomputer monitoring is started as in steps 106 and 107, the microcomputer 20 starts to control the various in-vehicle devices 40, and this program is terminated. In addition, this processing can be executed from a state where the microcomputer monitoring has already been started. This is executed after checking whether the microcomputer 20 is in the program overwriting mode that is allowed only when the vehicle is not in normal running.

Figure 4:
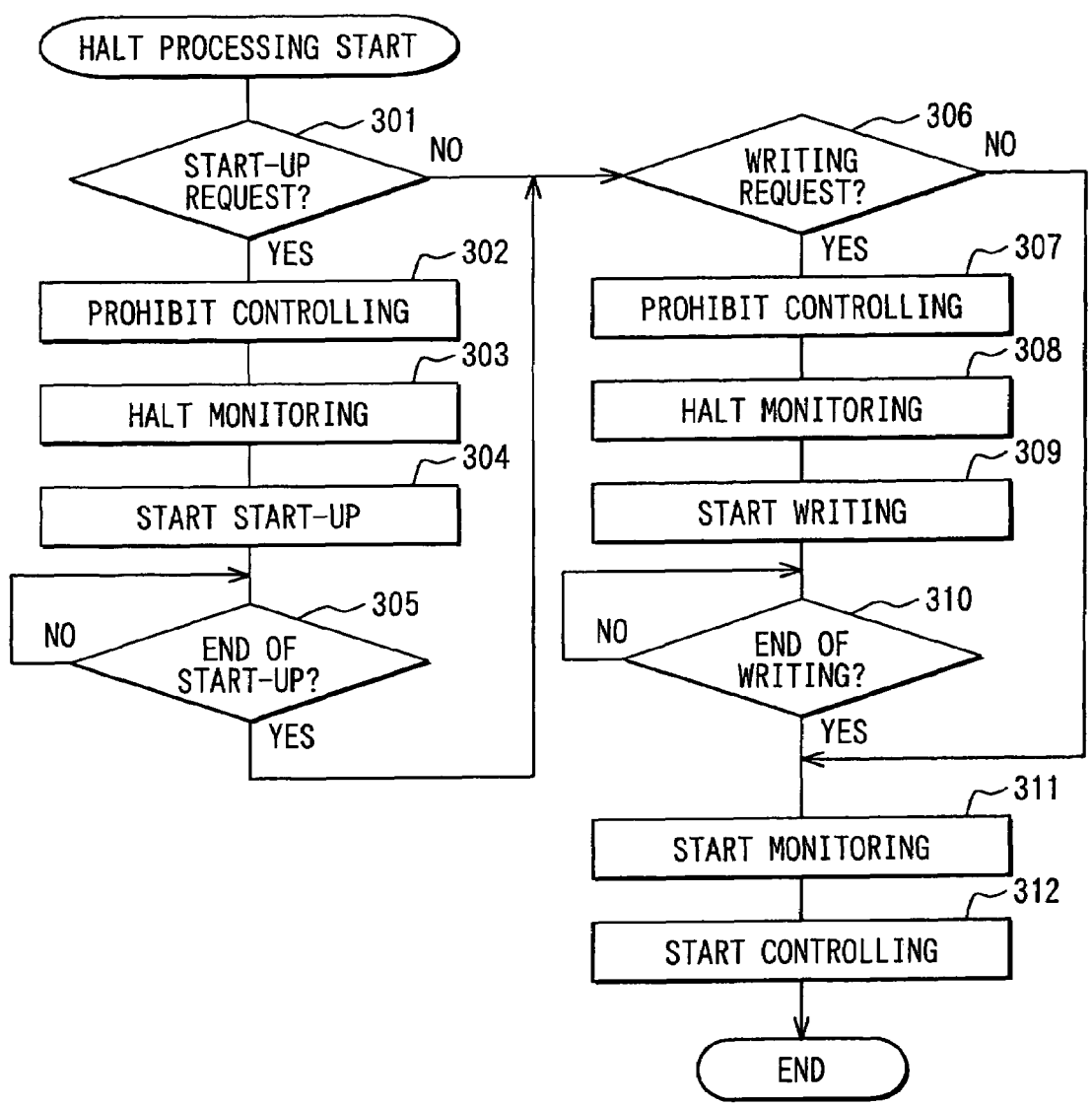
FIG. 4 is a flowchart showing a third example of microcomputer monitoring halt processing executed in the control system shown in FIG. 1.

The processing may be one that determines whether there is a program overwriting request to the microcomputer 20 in FIG. 3 immediately after the IG switch 30 in FIG. 1 is turned on. FIG. 4 shows a flowchart in this case.

In step 301 in FIG. 4, as in step 101, it is determined whether there is a start-up request to the microcomputer 20 that accompanies turning-on of the IG switch 30. When the start-up is requested, processing from step 302 to step 305 is executed. When there is no start-up request, the processing proceeds to step 306. The processing from step 302 to step 305 is identical to that of steps 102-105 in FIG. 2. After the start-up processing is terminated in step 305, the processing proceeds to step 306.

In step 306, it is determined whether the program writing is requested to the microcomputer 20. When there is the request, processing from step 307 to step 310 is executed. When there is no such a request, the processing proceeds to step 311. The processing from step 307 to step 310 is identical to that of steps 202-205 in FIG. 3. When the processing of writing the program into the microcomputer 20 is terminated in step 310, the microcomputer monitoring is started in step 311, and the microcomputer 20 starts to control the various in-vehicle devices in step 312.

This invention is not limited to these embodiments. Various modifications and variations can be made to this invention without departing from the technical scope based on the description of the appended claims.

What is claimed is:

1. An electronic control system comprising:
    a microcomputer that generates a control signal for controlling a control object based on a control program stored in storage means;
    monitoring means, that executes abnormality monitoring processing, for monitoring the microcomputer to check whether the microcomputer is normal and halts the microcomputer and the control object when the microcomputer is determined to be abnormal;
    heavy-load program processing requesting means for outputting a heavy-load program processing request signal that requests the microcomputer to process a predetermined heavy-load program stored in the storage means when the microcomputer is in a state other than a predetermined normal control;
    monitoring halting means for halting the abnormality monitoring processing in response to an input of the heavy-load program processing request signal; and
    control prohibiting means for halting the control object on a safe side by blocking out the control signal of the microcomputer so as not to be transmitted to the control object in response to an input of the heavy-load program processing request signal when the abnormality monitoring processing is halted by the monitoring halting means.

2. The electronic control system according to claim 1, wherein the control prohibiting means prohibits the microcomputer from controlling the control object and the monitoring halting means halts the abnormality monitoring processing executed by the monitoring means, when the heavy-load program processing requesting means issues the heavy-load program processing request to the microcomputer, and subsequently the microcomputer executes the heavy-load program processing.

3. The electronic control system according to claim 1, wherein when the heavy-load program processing is terminated, and subsequently the control prohibiting means cancels control prohibition laid on control of the control objects by the microcomputer after the monitoring means resumes the abnormality monitoring processing of the microcomputer and confirms the normal operation of the microcomputer.

4. The electronic control system according to claim 3, wherein the monitoring means halts the output of the supervisory signal in response to an input of the heavy-load program processing request signal.

5. The electronic control system according to claim 1, wherein the monitoring means executes the abnormality monitoring processing by outputting a predetermined supervisory signal to the microcomputer, making the microcomputer perform arithmetic processing, and determining whether the microcomputer operates normally based on an operation result and arithmetic processing time.

6. The electronic control system according to claim 5, wherein the monitoring means halts the operation result determination processing in response to the heavy-load program processing request signal.

7. The electronic control system according to claim 1, wherein the heavy-load program processing requesting means issues the heavy-load program processing request signal in response to a processing request signal for requesting the processing of the heavy-load program that is inputted from an outside of the microcomputer to the microcomputer.

8. The electronic control system according to claim 1, wherein the control prohibiting means is a circuit electrically connected to the microcomputer and the control object in order to prohibit the microcomputer from controlling the control objects.

9. The electronic control system according to claim 1, wherein the control object is provided in a vehicle, and a state other than the normal control is an initial control state where the control is executed by the microcomputer immediately after ignition start of the vehicle.

10. The electronic control system according to claim 1, wherein the control object is provided in a vehicle, and the heavy-load program is in a state where a program stored in the storage means of the microcomputer is overwritten at a time of vehicle stop.

11. An electronic control system, comprising:
a microcomputer having a control processing unit and a memory, the microcomputer being configured to control a control object based on a control program stored the memory;
a monitoring block operatively connected to the microcomputer and configured to monitor operations of the microcomputer and halt the microcomputer and the control object when the microcomputer is operating abnormally;
a heavy-load program processing requesting unit operatively connected to the microcomputer and configured to output a request signal to the microcomputer to execute a predetermined heavy-load program stored in the memory when the microcomputer is in a state other than a predetermined normal control;
a monitoring halting device operatively connected to the microcomputer and configured to halt monitoring operations in response to an input signal from the heavy-load program processing unit; and
a control prohibiting circuit operatively connected to the microcomputer and configured to halt the control object on a safe side by blocking a control signal of the microcomputer so as not to be transmitted to the control object in response to an input signal of the heavy-load program processing unit when monitoring operations are halted by the monitoring halting device.

* * * * *